US009307038B2

(12) United States Patent
Bekiares et al.

(10) Patent No.: US 9,307,038 B2
(45) Date of Patent: Apr. 5, 2016

(54) METHOD FOR PRESENCE NOTIFICATION BASED ON A SEQUENCE OF EVENTS

(75) Inventors: Tyrone D. Bekiares, Chicago, IL (US); Anatoly Agulnik, Deerfield, IL (US); Peter M. Drozt, Prairie Grove, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 614 days.

(21) Appl. No.: 12/648,943

(22) Filed: Dec. 29, 2009

(65) Prior Publication Data

US 2011/0161397 A1 Jun. 30, 2011

(51) Int. Cl.
*H04L 29/08* (2006.01)
*H04L 12/58* (2006.01)
*G06F 15/02* (2006.01)
*G06Q 10/10* (2012.01)

(52) U.S. Cl.
CPC ............ *H04L 67/24* (2013.01); *G06F 15/0266* (2013.01); *G06Q 10/109* (2013.01); *H04L 12/581* (2013.01); *H04L 51/04* (2013.01)

(58) Field of Classification Search
CPC ....... H04L 67/24; H04L 12/581; H04L 51/04; G06F 15/0266; G06Q 10/109
USPC ................................................. 709/203, 206
See application file for complete search history.

(56) References Cited

U.S. PATENT DOCUMENTS

| | | | |
|---|---|---|---|
| 6,208,996 B1 * | 3/2001 | Ben-Shachar et al. ................ 1/1 |
| 6,763,384 B1 | 7/2004 | Gupta et al. | |
| 6,885,861 B2 * | 4/2005 | Koskelainen ............... 455/414.2 |
| 7,571,249 B2 * | 8/2009 | Wu ................................. 709/238 |
| 7,688,133 B2 * | 3/2010 | Yamamoto et al. ............. 330/51 |
| 7,761,522 B2 * | 7/2010 | Shenfield et al. ............. 709/206 |
| 8,060,572 B2 * | 11/2011 | Brown et al. ................. 709/206 |
| 8,341,237 B2 * | 12/2012 | Benhase et al. .............. 709/212 |
| 2002/0173304 A1 * | 11/2002 | Horompoly ................... 455/426 |
| 2003/0097485 A1 | 5/2003 | Horvitz et al. | |
| 2003/0131069 A1 | 7/2003 | Lucovsky et al. | |
| 2003/0131142 A1 | 7/2003 | Horvitz et al. | |
| 2003/0216137 A1 * | 11/2003 | Hymel ....................... 455/412.1 |
| 2004/0059781 A1 | 3/2004 | Yoakum et al. | |
| 2004/0161090 A1 * | 8/2004 | Digate et al. ............. 379/202.01 |

(Continued)

FOREIGN PATENT DOCUMENTS

| | | |
|---|---|---|
| CN | 01115094 A | 1/2008 |
| JP | 2006174013 A | 6/2006 |
| JP | 2009146155 A | 2/2009 |
| WO | 2007141610 A2 | 12/2007 |

OTHER PUBLICATIONS

International Search Report and Written Opinion mailed on Aug. 11, 2011 for International Application No. PCT/US10/59068.

(Continued)

*Primary Examiner* — Backhean Tiv
(74) *Attorney, Agent, or Firm* — Daniel R. Bestor

(57) ABSTRACT

A client entity generates a subscription to a presentity that includes a sequence of events which define a trigger that controls when a presence server sends a notification to the client entity; and the subscription further indicates a time period parameter for the sequence of events. Upon receiving the subscription, the presence server receives and monitors presence information based on the indicated time period parameter to detect an occurrence of the sequence of events, and sends the notification to the client entity when the presence information satisfies the trigger.

18 Claims, 4 Drawing Sheets

(56) References Cited

U.S. PATENT DOCUMENTS

| | | | |
|---|---|---|---|
| 2006/0069686 A1* | 3/2006 | Beyda et al. | 707/10 |
| 2006/0075091 A1* | 4/2006 | Beyda et al. | 709/224 |
| 2007/0014280 A1* | 1/2007 | Cormier et al. | 370/352 |
| 2007/0016673 A1* | 1/2007 | Shinohara et al. | 709/224 |
| 2008/0077696 A1 | 3/2008 | Nguyen et al. | |
| 2008/0147822 A1* | 6/2008 | Benhase et al. | 709/217 |
| 2008/0177857 A1 | 7/2008 | Chakra et al. | |
| 2008/0208953 A1* | 8/2008 | Tian | 709/201 |
| 2009/0138566 A1 | 5/2009 | Ito et al. | |
| 2009/0177729 A1 | 7/2009 | Ben Ezra et al. | |
| 2010/0088371 A1* | 4/2010 | Xu et al. | 709/203 |
| 2010/0262661 A1* | 10/2010 | McColgan et al. | 709/206 |
| 2010/0312847 A1* | 12/2010 | Boberg et al. | 709/206 |
| 2010/0332647 A1* | 12/2010 | Agulnik et al. | 709/224 |
| 2011/0074579 A1* | 3/2011 | Agulnik et al. | 340/541 |
| 2011/0113106 A1* | 5/2011 | Klein et al. | 709/206 |
| 2011/0161397 A1* | 6/2011 | Bekiares et al. | 709/203 |

OTHER PUBLICATIONS

Khartabil, H. et al., "An Extensible Markup Language (XML)-Based Format for Event Notification Filtering," RFC 4661, Sep. 2006, 48 pages.
Khartabil, H. et al., "Functional Description of Event Notification Filtering," RFC 4660, Sep. 2006, 31 pages.
Corresponding Japanese Patent Application No. 2012-547091—Translation of Office Action issued Nov. 5, 2013.
Corresponding Canadian Patent Application No. 2785725—Office Action mailed Jan. 7, 2014—7 pp.
Corresponding Application No. '10798870.1—European Search Report mailed Jan. 24, 2014.
Corresponding Korean Patent Application No. 10-2012-7019989—Translation of Office Action issued Feb. 27, 2014.
Corresponding Chinese Patent Application No. 201080060008.7—Translation of Office Action issued Jun. 16, 2015.

* cited by examiner

METHOD FOR PRESENCE NOTIFICATION BASED ON A SEQUENCE OF EVENTS

FIELD OF THE DISCLOSURE

The present disclosure relates generally to a presence service and more particularly to methods for presence notification based on a sequence of events.

BACKGROUND

With the advancement in technology, communications systems are capable of providing better services to the users. In some applications that make use of presence services, communication devices report ("publish") to a central network entity (a "presence server") status or presence information of users of the communication devices ("presentities"). The presence server distributes ("notifies") the presence information to other users ("watchers") in the communications system. Generally, the presence information includes information such as the status of the communication device, availability of a user of the device, location of the communication device, current operation being performed by the device, preferred communications of the user, and the like.

Standard presence functionality allows a watcher (user, device, or application) to subscribe to the presence server to receive presence information related to one or more presentities. The subscription can be done individually for the one or more presentities or by using a Presence Resource List that includes multiple presentities. Upon subscribing to the one or more specified presentities, the watcher is notified of presence information for the specified presentites.

Internet Engineering Task Force (IETF) Request for Comments (RFCs) 4460 and 4461 discuss an Extensible Markup Language (XML) based method that allows SIP/SIMPLE watchers to supply notification filter criteria as part of the subscription. The presence server then evaluates the criteria to determine if and when to notify the subscribing watcher. However, RFCs 4460 and 4461 allow a watcher to reference (in the supplied notification criteria) only an unordered plurality of synchronous current presence values that occur at the same time. For example, the criteria can comprise that the watcher be notified when a presence information element A has a value of 'a1', and a presence information element B has a value of 'b1' at the same time. This simple subscription and notification mechanism is generally sufficient for consumer users. However, it is insufficient to meet the needs of certain other users such as public safety users who would benefit from more sophisticated techniques that include, for example, the ability to specify notification triggers based on: historical and future values of presence information elements; an ordered or unordered sequence of events; and/or time period parameters for events corresponding to changes to presence information, which is not available in known subscription and notification mechanisms.

Accordingly, there is a need for a method for presence notification based on a sequence of events.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
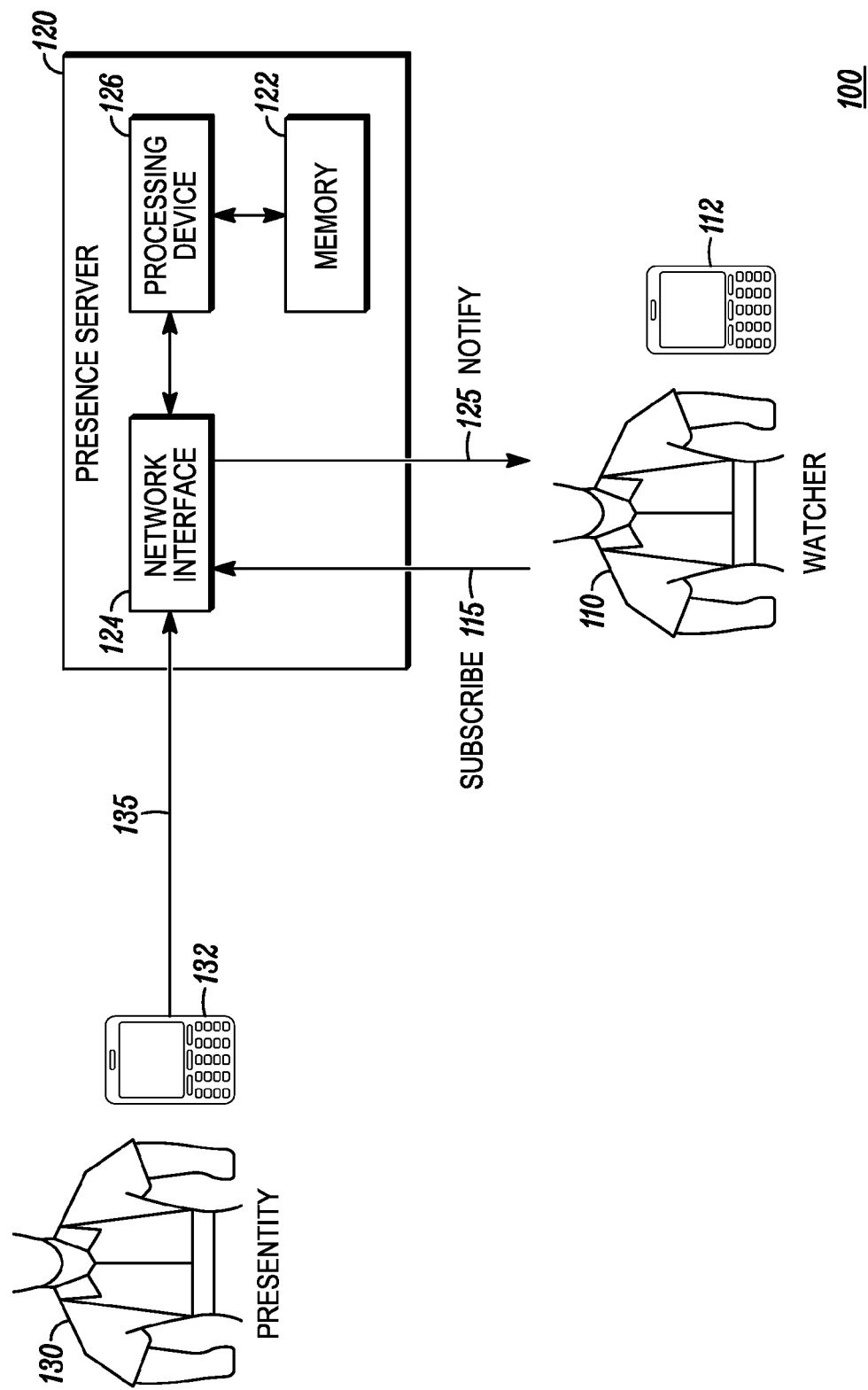
FIG. 1 is a block diagram of a communications system for presence notifications based on a sequence of events, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, a client entity generates a subscription to a presentity that includes a sequence of events which define a trigger that controls when a presence server sends a notification to the client entity; and the subscription further indicates a time period parameter for the sequence of events. Upon receiving the subscription, the presence server receives presence information and monitors the presence information based on the indicated time period parameter to detect at least one occurrence of the sequence of events, and sends the notification to the client entity when the presence information satisfies the trigger.

With the inclusion of a sequence of events as part of the trigger criteria in the subscription, watchers can set much more complex "scenario-based" notification triggers. Moreover, by indicating or identifying a time period parameter in the subscription as part of the trigger criteria, watchers can now reference past and future presence information. Further, watchers can explicitly denote the order in which certain presence states must transition to satisfy a trigger and can use advanced Boolean logic to set when notifications are to occur, thereby providing additional flexibility in the trigger mechanism that is useful in many implementations, especially in the context of public safety. Those skilled in the art will realize that the above recognized advantages and other advantages described herein are merely illustrative and are not meant to be a complete rendering of all of the advantages of the various embodiments.

Referring now to the drawings, and in particular FIG. 1, a block diagram illustrating a communications system is shown and indicated at 100, which provides notifications to a client entity in accordance with embodiments of the present disclosure. Those skilled in the art will recognize and appreciate that the specifics of the examples in this detailed description are merely illustrative of some embodiments and that the teachings set forth herein are applicable in a variety of alternative settings. For example, in the described embodiments, the presence feature that is implemented in the communications system 100 is performed using proprietary protocols (such as protocols that implement the embodiments of the disclosure described by reference to FIGS. 2 to 5) and standard protocols, such as the Presence SIMPLE Specification (current draft dated Feb. 3, 2009) published by Open Mobile Alliance (OMA) that defines an application level specification for a SIP/SIMPLE-based presence service that makes use of SIP (Session Initiation Protocol described in RFC 3261); and SIMPLE made simple (current draft dated Mar. 9, 2009) published by the Internet Engineering Task Force (IETF) that describes instant messaging and presence using SIP, wherein the standard presence protocols are collectively referred to herein as SIP/SIMPLE. However, the described teachings are in no way limited to this system implementation. Moreover, the system may include more watchers, presentities, presence servers, communication devices, and other entities than what is shown in FIG. 1.

The communications system 100 comprises: a presence server 120; a user 110 using a communication device 112; and a user 130 using a communication device 132, wherein the communication devices 112 and 132, and the presence server 120 are all communicatively coupled over a network (not shown) for presence information subscriptions and corresponding presence information notifications, in accordance with the teachings herein. The network can be a wired network, a wireless network, or a network enabling both wired and wireless communications and usually includes a number of network infrastructure devices including, but not limited to, bridges, switches, zone controllers, base station controllers, repeaters, base radios, base stations, base transceiver stations, access points, routers or any other type of infrastructure equipment interfacing any entity in a wireless or wired environment.

The communication devices 112 and 132 (referred to herein as "client entities") are also referred to in the art as access devices, access terminals, user equipment, mobile stations, mobile subscriber units, mobile devices, and the like, and can be any standard communication device such as radios, mobile phones, Personal Digital Assistants (PDAs), laptops, two-way radios, cell phones, and any other device capable of operating in a wired or wireless environment. Each communication device includes (although not shown) a memory, one or more network interfaces, and a processing device that are operatively coupled.

The network interfaces can be used for, one or more of: publishing presence information for a presentity to the presence server 120; subscribing to presence information for a presentity and, as a result of the subscribing, receiving notifications from the presence server 120, in accordance with the teachings herein; and other communications with the presence server 120 to enable the implementation of methods in accordance with the present teachings. The implementation of the network interfaces depends on the particular type of network, i.e., wired and/or wireless, to which the communication devices are connected. For example, where the network supports wired communications, the interfaces may comprise a serial port interface (e.g., compliant to the RS-232 standard), a parallel port interface, an Ethernet interface, a USB interface, and/or a FireWire interface, and the like. Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed in the processing device of the communication device through programmed logic such as software applications or firmware stored on the memory device of the communication device.

Besides the above-mentioned functionality, implemented via programmed logic or code, the processing device of each communication device is further programmed with logic or code for implementing methods such as method 300 described below by reference to FIG. 2; and/or the processing device may be implemented as a state machine or ASIC. The memory in the communication devices can include short-term and/or long-term storage of various data, e.g., presence information, configuration information, etc., needed for the functioning of the communication device. The memory may further store software or firmware for programming the processing device with the logic or code needed to perform its functionality.

Turning now to the presence server 120, it includes a memory 122, one or more network interfaces 124, and a processing device 126 operatively coupled for performing the functionality of the presence server 120. The network interface 124 can be wired, wireless, or a combination of both (examples of which are given above) depending on the particular network to which the presence server 120 is connected. The processing device 126 may be programmed with logic or code to perform its functions, wherein the logic is stored as software and or firmware in the memory 122 (examples of which are given above); and/or the processing device 126 may be implemented as a state machine or ASIC.

Operationally, the presence server 120 receives, in each of a number of publish messages from client entities (such as a message 135 from device 132, which can be for instance a SIP/SIMPLE PUBLISH message), a value for a presence information element pertaining to a presentity. Presence information pertaining to a particular presentity includes one or more presence information elements, and a presentity generally sends many publish messages over a period of time for different or the same presence information elements. The presence server 120 maintains (in the memory 122) a current value and, in some embodiments, further maintains a set of (one or more) previous or past values for at least one presence information element for one or more presentities.

The presence server 120 further receives in one or more subscribe messages from a watcher (such as a subscribe message 115, which can be for instance a SIP/SIMPLE SUBSCRIBE message) a request to be notified regarding a sequence of events for one or more presentities, wherein the sequence of events define a trigger that controls when the presence server sends the notification to the client entity; and the subscribe request further indicates a time period parameter for the sequence of events. In response to the subscribe request, the presence server 120 receives and monitors presence information based on the indicated time period parameter to detect an occurrence of the sequence of events and provides 125 to the watcher (for example in one or more SIP/SIMPLE NOTIFY messages) a notification when the monitored presence information satisfies the trigger.

Definitions for some of the terms used herein will assist in understanding the disclosed teachings. For instance, a presence server is defined as a functional entity that accepts, stores, and distributes presence information or other data associated with presence information. Presence information is defined as a dynamic set of information pertaining to a presentity that indicates status, reachability, willingness, and/or capabilities of a presentity to communicate. Presence information includes, but is not limited to, such status information as, for instance, user availability, location, network availability, user mood, moving direction, speed, destination, estimated time to reach a destination, distance from a destination, incident phase, completed percentage, stage, or phase of an assigned task during an incident, etc. Presence information is comprised of one or more presence information elements, wherein a presence information element is defined as a basic unit of presence information. A presence information element can be associated with a current alpha-numeric value (also referred to herein simply as a value) and/or a set (i.e., one or more) of previous values. A value for a presence information element is defined as a presence related state for that presence information element at a given point in time. For example, a value for a presence information element can define status of a user, such as "away", "out of office", and the like. Moreover, a set of current values for a number of presence information elements for a presentity at a particular point in time represents the presence state of the presentity at that particular point in time.

A watcher is defined as a uniquely identifiable logical entity, in a device, that is subscribed to certain presence information for one or more presentities. A presentity is defined as a logical entity described by presence information. Presentities may represent devices and/or people, and may also represent other types of entities including, but not limited to, servers, buildings, vehicles, applications, or other logical and physical entities. Also a plurality of presentities may be identified by a Presence Resource List (PRL), which is defined as a pre-defined list of presentities (e.g., "Buddy List") that is traditionally subscribed to in a single operation by a watcher.

A subscription (also referred to herein as a subscribe request) is defined as request from a client entity to a presence server for a subsequent notification when one or more triggers that are defined in the subscription have been satisfied. A notification is accordingly defined as the response that the presence server sends to the client entity when one or more of the triggers defined in an associated notification have been satisfied by presence information received at the presence server. A sequence of events is defined as a set of multiple events wherein at least two of the events in the sequence must occur in succession or at different times (or in other words, asynchronously) over a span of time. An event is defined as a state transition from one value to a different value for one or more presence information elements; and for an event defined by multiple presence information elements, the state transition for all elements may be synchronous or asynchronous. Thus, an event could itself comprise a "subsequence" defined by its own sequence of ordered or unordered events.

Figure 2:
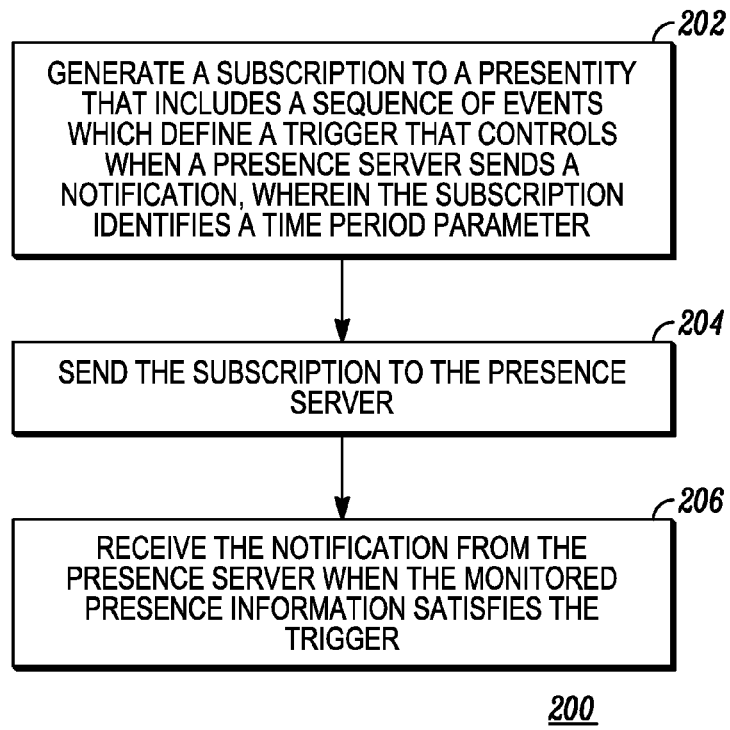
FIG. 2 is a flow diagram of a method, at a client entity, for enabling presence notifications based on a sequence of events, in accordance with some embodiments.
Figure 3:
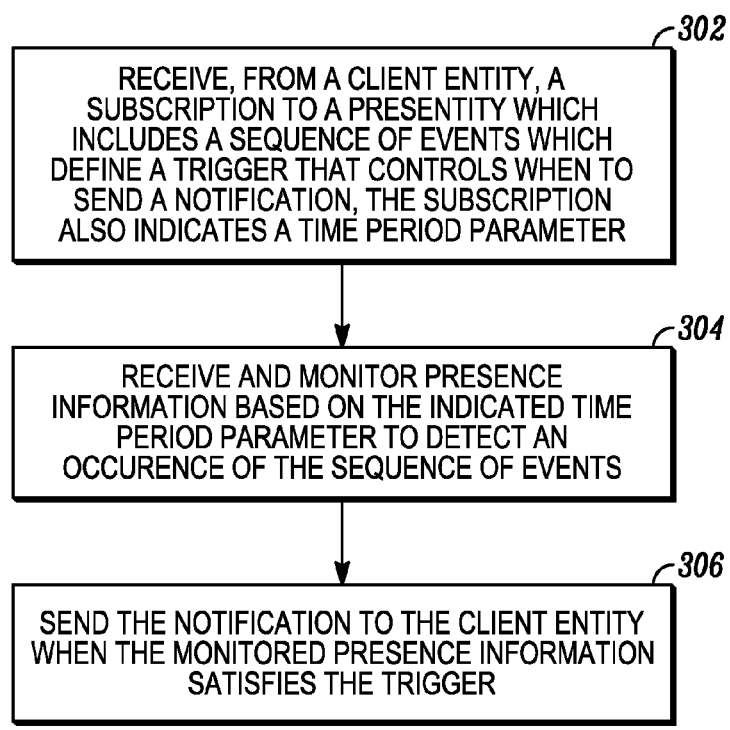
FIG. 3 is a flow diagram of a method, at a presence server, for enabling presence notifications based on a sequence of events, in accordance with some embodiments.
Figure 4:
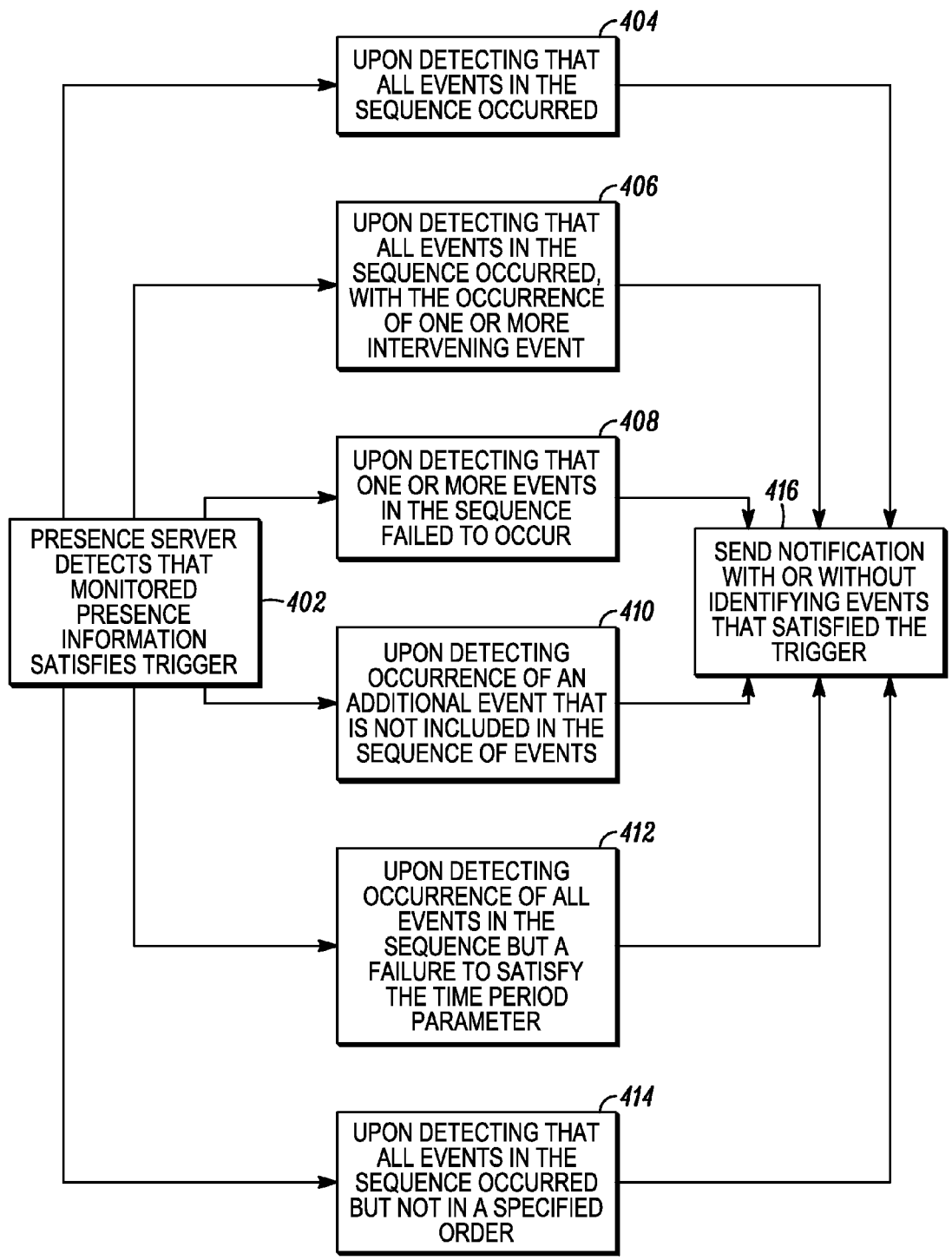
FIG. 4 is a flow diagram showing the presence server detecting under various conditions that monitored presence information satisfies the trigger to send a notification, in accordance with some embodiments.

Turning now to FIGS. 2 to 4. In FIG. 2, a flow diagram illustrating a method for a subscription to receive presence notification based on a sequence of events is shown and indicated at 200. A client entity, such as the client entity 112 shown in FIG. 1, performs at least some of the steps of the method 200. FIG. 3 illustrates a flow diagram of a companion method 300 for presence notification based on a sequence of events, and FIG. 4 illustrates a flow diagram 400 showing various conditions under which monitored presence information satisfies the trigger for sending a notification. In an embodiment, the functionality shown in FIGS. 3 and 4 is implemented in a presence server, such as the presence server 120, although some of the described functionality can be performed at one or more supporting hardware units external to the presence server 120. Moreover, with respect to the description herein, the functionality illustrated and described by reference to the flow diagrams of FIGS. 2 to 5 can be performed by means of, for example, a processing device (examples of which are given below) programmed with logic or code to perform its functions, wherein the logic is stored as software and or firmware in a suitable memory device; and/or a processing device implemented as a state machine or ASIC.

Turning first to method 200 shown in FIG. 2; at 202, the client entity 112 generates a subscription to a presentity. The subscription includes a sequence of events (ordered or unordered) which define a trigger that controls when a presence server sends a notification to the client entity 112, and the subscription further identifies or otherwise indicates a time period parameter for the sequence of events. Having the trigger mechanism based on the sequence of events and the time period parameter provides additional flexibility in defining triggers.

Many triggers can be defined based on a sequence of events. Examples of which include, but are not limited to defining the trigger (regardless of the sequence of events being ordered or unordered, i.e., having no specified order) as being satisfied: upon detecting that all of the events in the sequence of events occurred; or upon detecting that all of the events in the sequence of events occurred, but with an occurrence of one or more intervening events; or upon detecting that one or more of the events in the sequence of events failed to occur; or upon detecting occurrence of an additional event that is not included in the sequence of events; or upon detecting that all of the events in the sequence of events occurred but failed to meet the time period parameter. Further, when the sequence of events is ordered, illustratively, the trigger can be defined as being satisfied upon detecting that all of the events in the sequence of events occurred but not in the specified order; wherein "order" is any order specified for one or more events in the sequence such as, but not limited to, an order among the events themselves, and (where an event comprises a subsequence) no order between the events themselves but order within the subsequence. Additional description and particular examples of the presence server detecting that such triggers are satisfied is provided below, for example, by reference to the description accompanying FIG. 4.

Regarding the time period parameter for the sequence of events, a "time period parameter" is defined to include any time restriction or limitation placed on one or more events in the sequence, which also provides a large measure of flexibility in the subscription and notification mechanism of the present disclosure. Moreover, as a point of distinction from known notification mechanisms, the current teachings consider timing of state transitions within the sequence of events based on or under the guidelines of the time period parameter (as further explained via examples provided below) provided in the subscription. Whereas, timing of state transitions is not considered in the known art since all transitions occur synchronously. In one example, the time period parameter is not explicitly specified, and the lack of an explicit inclusion of the time period parameter in the subscription indicates an implicit default time period parameter this is ongoing (for an unbounded time period) until the presence server detects that the trigger is satisfied one or more times.

Alternatively, the time period parameter for the sequence of events can be explicitly specified or indicated in the subscription in any number of ways. In the following time period parameter examples, to facilitate understanding of embodiments of the present disclosure, a sequence of events is defined as including events A, B, and C, wherein each event comprises state transitions for one or more presence information elements, and wherein at least two of the events occur asynchronously (i.e., at different times). For example, event A is a present information element A that is assigned a value of 'a', event B is a present information element B that is assigned a value of 'b', and event C is a present information element C that is assigned a value of 'c'.

In one illustrative implementation, the time period parameter is a bounded time period having a beginning time and a subsequent ending time. For instance, the time period parameter indicates to the presence server to monitor presence information received from 1 pm to 3 pm for the occurrence of events A, B, and C, and to send a notification if the sequence of events occurs within that time frame. This is also an example of an absolute time limit, in this case a total time limit for the occurrence of the entire sequence of events. Moreover, one or more of the events in the sequence can be associated with its own individual absolute time limit. For instance. Event A has to occur by 1:30 pm; and event B has to occur by 2 pm.

Alternatively, the time period parameter may be bounded only by the beginning time period or the ending time period but not both. Furthermore, the subscription, by including the beginning time period, can explicitly direct the presence server to monitor past occurrences of events. More particularly, in one implementation, the beginning time period specified in the subscription specifies a time to begin monitoring presence information that occurred before the client entities sends and the presence server receives that subscription. Accordingly, the presence server would monitor past presence information that is stored at a location accessible to the presence server.

In yet another illustrative implementation, the time period parameter comprises a relative time limit between two or more of the events for occurrence of the events. For example, each "transition" between the events in the sequence of events could have a time limit or time frame associated with it, e.g., after event A occurs, event B needs to occur within 15 minutes; and after event B occurs, event C needs to occur within 30 minutes.

More to this implementation of relative time limits, the subscription may further include a time period parameter for the subscription that limits the time frame during which the notification can be sent. Accordingly, there may be some interaction between these two time frames. For instance, where sequenceTimeFrame is the time limit for the sequence to occur, and subscriptionExpiration is the time limit to be notified when the sequence occurs (e.g., a subscriptionTimeFrame value provided in a header of a SIP SUBSCRIBE message), if sequenceTimeFrame (e.g. this sequence of events must happen within 30 m of one another) is less than subscriptionExpiration (notify me whenever the sequence of events completes over the next week), then a state machine that tracks completion of events must be self-resetting.

In other words, say the trigger is defined as A→B→C all within 30 m of one another (the sequenceTimeFrame). If A→B→C occurs within 30 m, then the client entity is notified, and the state machine is reset again waiting for A→B→C, and will notify again (up to a week, the subscriptionExpiration) if necessary. Likewise, if A→B but not C within 30 m, then 30 m after A, the state machine is cleared, and the presence server again monitors for A→B→C. The sequenceTimeFrame could also be "rolling" for unordered events, so if we require A=true, B=true, and C=true within 30 m of one another, and A=true at T=0 m, B=true at T=15 m, and C=true at T=35 m, the A,B,C sequence did not complete in under 30 m, but if A=true now happens again at T=45 m, then B,C,A (which satisfies the unordered event criteria) did happen under 30 m, starting at T=15 m, completing at T=45 m. So the 30 m clock was "reset" at B=true at T=15 m.

In yet another illustrative implementation, the setting of the trigger to reference past and future occurrence of events and the indication of time period parameters are accomplished by way of advanced Boolean logic, in one illustrative implementation. Of course, the aforementioned implementations were all merely example implementations that are in no way meant to limit the scope of the teachings herein.

As mentioned above, the subscription may be in the format of a SIP SUBSCRIBE message. Two examples of extended SIP SUBSCRIBE messages follow. In the first example, a presence watcher (CommanderX@agency.gov) wants to be notified whenever any user in the group officers@agency.gov previously assigned to Incident1234 over the course of the day becomes available (regardless of what other incidents these officers may have been assigned to in the interim).

```
SUBSCRIBE sip:officers@agency.gov SIP/2.0
Event: presence
To: sip:officers@agency.gov
From: sip:CommanderX@agency.gov
<?xml version="1.0" encoding="UTF-8"?>
<filter-set
    xmlsns="urn:ietf:params:xml:ns:simple-filter"
    xmlns:rt="urn:ietf:params:xml:ns:simple-filter:scenario"/>          (1)
        <ns-bindings>
            <ns-binding prefix="pidf"
            urn="urn:ietf:params:xml:ns:pidf"
                xmlns:ps="urn:ietf:params:xml:ns:pidf:public-safety"/>
        </ns-bindings>
        <filter id="8439">
            <trigger>
                <changed from="Incident1234"
                time-search="today"
                    to="available">                                      (2)
                    //pidf:tuple/pidf:status/pidf:cad-status
                </changed>
            </trigger>
        </filter>
</filter-set>
```

Line (1) is an extension to SIP/SIMPLE and comprises a new XML namespace for implementing the teachings herein, and line (2) defines the trigger based on the sequence of events. In another example, a presence watcher (SupervisorY@airport.gov) wants to be notified whenever any user in the list employees@airport.gov successively crosses doors 3, 5, 6 (in that order) over the course of the last 12 hours.

```
SUBSCRIBE sip:employees@airport.gov SIP/2.0
Event: presence
To: sip:employees@airport.gov
From: sip:SupervisorY@airport.gov
<?xml version="1.0" encoding="UTF-8"?>
<filter-set
    xmlsns="urn:ietf:params:xml:ns:simple-filter"
    xmlns:rt="urn:ietf:params:xml:ns:simple-filter:scenario"/>          (3)
        <ns-bindings>
            <ns-binding prefix="pidf"
            urn="urn:ietf:params:xml:ns:pidf"
                xmlns:ps="urn:ietf:params:xml:ns:pidf:airport"/>
        </ns-bindings>
        <filter id="8439">
            <trigger>
                <changed to="3" time-search="-12 hours"                  (4)
                order="1">
                    //pidf:tuple/pidf:location/pidf:last-door
                </changed>
                <changed to="5" time-search="-12 hours"                  (5)
                order="2">
                    //pidf:tuple/pidf:location/pidf:last-door
                </changed>
                <changed to="6" time-search="-12 hours"                  (6)
```

-continued

```
            order="3">
                //pidf:tuple/pidf:location/pidf:last-door
            </changed>
        </trigger>
    </filter>
</filter-set>
```

Line (3) is the XML namespace, and lines (4) to (6) identify the trigger based on a sequence of events. Turning back FIG. 2, the client entity sends (204) the subscription to the presence server, and receives (206) the notification from the presence server when the monitored presence information satisfies the trigger. In an embodiment, the notification identifies a plurality of events that satisfied the trigger.

Turning now to FIG. 3, at 302, the presence server receives the subscription with the trigger defined by the sequence of events and which further indicates the time period parameter. Upon receiving the subscription, the presence server monitors (304) presence information that it receives, based on the indicated time period parameter, in an attempt to detect an occurrence of the sequence of events. As mentioned above, such monitoring may include monitoring stored past presence information. The presence server sends (306) the notification to the client entity when the monitored presence information satisfies the trigger defined in the subscription.

FIG. 4 illustrates the presence server monitoring the presence information and detecting (402) that the monitored presence information satisfies the trigger. Alternative detection scenarios 404 to 414 are illustrated. At 404, the monitored presence information satisfies the trigger upon the presence server detecting that all events in the sequence occurred, in either an "exact" sequence with no intervening events or a "loose" sequence (406) with one or more intervening events. For example, for an exact non-ordered sequence—events A and B and C all occurred in any order but no other events happened, e.g. B→A→C or even A→B→A→C. For a loose non-ordered sequence—all events occurred in any order with possible other non-listed events between them, e.g., C→B→X→A. For an exact ordered sequence—A then B then C with nothing in between them. Moreover, for a loose order sequence—B after A and C after B but some other events may happen between them, e.g. A→X→B→Y,Z→C.

At 408, the monitored presence information satisfies the trigger, e.g., the sequence failed, upon the presence server detecting that one or more events in the sequence failed to occur. This is applicable to both the unordered sequence of events and the ordered sequence of events.

Figure 5:
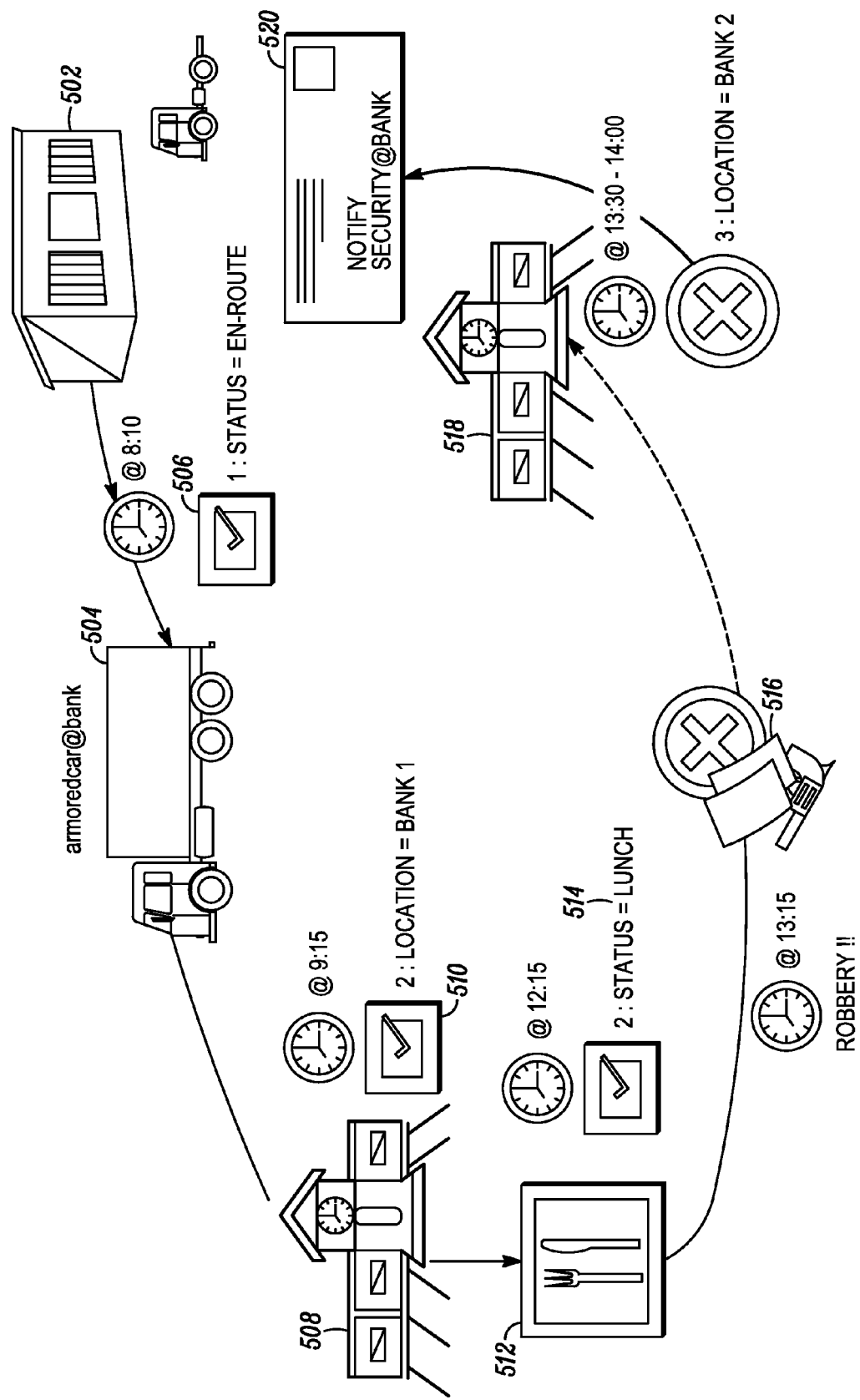
FIG. 5 is a pictorial diagram illustrating a presence server monitoring presence information and providing a notification based on a sequence of events, in accordance with some embodiments.

At 410, the monitored presence information satisfies the trigger, e.g., the sequence failed, upon the presence server detecting occurrence of an additional event that was not included in the sequence. The third SIP SUBSCRIBE example and accompanying description by reference to FIG. 5 illustrates this trigger scenario. In an additional example, for an exact non-ordered sequence failure—all events occurred but a non-listed event happens between any of the listed events, e.g., A→B→X→C or C→B→X→A. For an exact ordered sequence failure—all events occurred in the specified order but a non-listed event happens between any of the exact ordered events, e.g., A→B→X→C.

At 412, the monitored presence information satisfies the trigger, e.g., the sequence failed, upon the presence server detecting that all events in the sequence occurred but did not satisfy the time period parameter. Examples were given above as corresponds to this illustrative implementation. In addition detection scenario 412 is applicable to both ordered and unordered sequences of events.

At 414, the monitored presence information satisfies the trigger, e.g., the sequence failed, upon the presence server detecting that all events in the sequence occurred but not in the specified order (for an ordered sequence of events). For example, for an ordered sequence failure—all events occurred but out of specified order, e.g., B→A→C. Upon determining that the trigger has been satisfied for any of these illustrative scenarios, the presence server sends (416) the notification to the client entity with or without identifying events that satisfied the trigger depending on the direction provided in the subscription or a default regarding supplying such data.

FIG. 5 provides a pictorial illustration of a presence server monitoring presence information in response to receiving a subscription and notifying a client entity when the ordered sequence failed. In this illustrative implementation, the client entity sends the following SIP SUBSCIBE message, wherein a presence watcher (security@bank.com) wants to be notified if and only if a watcher user (armoredcar@bank.com) does not follow a particular set of state transitions tomorrow.

```
SUBSCRIBE sip:armoredcar@bank.com SIP/2.0
Event: presence
To: sip:armoredcar@bank.com
From: sip:security@bank.com
...
<?xml version="1.0" encoding="UTF-8"?>
<filter-set
    xmlsns="urn:ietf:params:xml:ns:simple-filter"
    xmlns:rt="urn:ietf:params:xml:ns:simple-filter:scenario"/>    (7)
        <ns-bindings>
            <ns-binding prefix="pidf"
            urn="urn:ietf:params:xml:ns:pidf"
                xmlns:ps="urn:ietf:params:xml:ns:pidf:bank"/>
        </ns-bindings>
        <filter id="8439">
            <trigger Boolean="NOT AND">
                <changed to="enroute"                              (8)
                time-search="tomorrow 8:00-8:15"
                    order="1">
                        //pidf:tuple/pidf:status
                </changed>
                <changed to="bank1"
                time-search="tomorrow 9:00-9:30" order="2">
                                                                   (9)
                        //pidf:tuple/pidf:location/pidf:location
                </changed>
                <changed to="lunch"
                time-search="tomorrow 12:00-13:00"
                    order="3">                                    (10)
                        //pidf:tuple/pidf:status
                </changed>
                <changed to="bank2"
                time-search="tomorrow 13:30-14:00"
                    order="4">                                    (11)
                        //pidf:tuple/pidf:location/pidf:location
                </changed>
                <changed time-search="tomorrow"                   (12)
                to="delivered">
                        //pidf:tuple/pidf:payload/pidf:status
                </changed>
            </trigger>
        </filter>
</filter-set>
```

Line (7) is the XML namespace, and lines (8) through (12) define the trigger, which basically defines an ordered sequence of events that is expected to occur at specified times along the route of the armored car, with no intervening events. A failure of this sequence either due to occurrence an unspecified intervening event and/or a failure to meet time criteria causes a notification to be sent to the client entity.

FIG. 5 shows illustrative monitored presence information as corresponds to the subscription. At 8:10, an armored truck (504) (identified as presentity armoredcar@bank) leaves its current location (502) to start its route, thereby satisfying (506) a first event in the sequence to leave between 8:00-8:15 (defined at line (8) of the SIP SUBSCRIBE message). At 9:15, the armored truck arrived at a bank 508 for its first stop, thereby satisfying (510) a second event in the sequence to arrive at the bank between 9:00-9:30 (defined at line (9) of the SIP SUBSCRIBE message). At 12:15 the armored truck stopped for lunch (512), thereby satisfying (514) a third event in the sequence of a lunch time between 12:00-13:00 (defined at line (10) of the SIP SUBSCRIBE message).

However, a robbery (516) occurred at 3:15, which prevented the armored truck from arriving at its final destination (518) between 13:30-14:00 (defined at line (11) of the SIP SUBSCRIBE message), thereby causing the sequence to fail and triggering a notification (520) to a security service at security@bank.com. Notably, this example highlights the ability of embodiments to apply to future events. Additionally, it shows the use of advanced Boolean logic (NOT AND). Finally, it shows the use of mixed ordered/unordered criteria. The last element in the SIP SUBSCRIBE message (line 12) simply requires that at some point tomorrow, armoredcar@bank sets its payload delivery state to "delivered", which could happen after the bank1 or bank2 visit but in this case did not occur due to the robbery.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for presence notification based on a sequence of events, the method comprising:
   at a presence server:
   receiving, from a client entity, a subscription to a presentity that includes a sequence of events which define a trigger that controls when the presence server sends a notification to the client entity, wherein the subscription further indicates a time period parameter for the sequence of events, wherein the sequence of events comprises a plurality of events, wherein at least two events in the sequence of events occur at different times over a time period associated with the time period parameter, and wherein an event comprises a state transition from one value to a different value for one or more presence information elements;

receiving presence information and monitoring the presence information based on the indicated time period parameter to detect an occurrence of the sequence of events; and sending the notification to the client entity when the monitored presence information satisfies the trigger, wherein the monitored presence information satisfies the trigger:

upon the presence server detecting that all of the events in the sequence of events occurred; or upon the presence server detecting that all of the events in the sequence of events occurred, but with an occurrence of at least one intervening event; or upon the presence server detecting that at least one of the events in the sequence of events failed to occur; or upon the presence server detecting occurrence of an additional event that is not included in the sequence of events; or upon the presence server detecting that all of the events in the sequence of events occurred but failed to meet the time period parameter.

2. The method of claim 1, wherein the sequence of events comprises a sequence of events having a specified order.

3. The method of claim 1, wherein the sequence of events comprises a sequence of events having no specified order.

4. The method of claim 1, wherein:
the sequence of events comprises a sequence of events having a specified order; and
the monitored presence information satisfies the trigger upon the presence server detecting that all of the events in the sequence of events occurred but not in the specified order.

5. The method of claim 1, wherein the notification identifies a plurality of events that satisfied the trigger.

6. The method of claim 1, wherein monitoring the presence information comprises monitoring stored presence information.

7. The method of claim 1, wherein the time period parameter comprises a bounded time period having a beginning time and a subsequent ending time.

8. The method of claim 7, wherein the beginning time period occurs before the presence server receives the subscription.

9. The method of claim 1, wherein the time period parameter comprises at least one time limit for the occurrence of the sequence of events.

10. The method of claim 9, wherein the at least one time limit comprises at least one of:
an absolute time limit for the occurrence one or more of the events in the sequence of events;
a total time limit for the occurrence of all events in the sequence of events;
a relative time limit of occurrence between two or more of the events in the sequence of events;
a rolling time period for the occurrence of all of the events in the sequence of events, where the sequence of events comprises an unordered sequence of events.

11. The method of claim 1, wherein at least one event in the sequence comprises a subsequence.

12. A method for presence notification based on a sequence of events, the method comprising:
at a client entity:
generating a subscription to a presentity that includes a sequence of events which define a trigger that controls when a presence server sends a notification to the client entity, wherein the subscription further indicates a time period parameter for the sequence of events, wherein presence information received at the presence server is monitored based on the time period parameter to detect the sequence of events, wherein the sequence of events comprises a plurality of events, wherein at least two events in the sequence of events occur at different times over a time period associated with the time period parameter, and wherein an event comprises a state transition from one value to a different value for one or more presence information elements;

sending the subscription to the presence server; and receiving the notification from the presence server when the monitored presence information satisfies the trigger, wherein the trigger is defined, in the subscription, as being satisfied:

upon detecting that all of the events in the sequence of events occurred; or upon detecting that all of the events in the sequence of events occurred, but with an occurrence of at least one intervening event; or upon detecting that at least one of the events in the sequence of events failed to occur; or upon detecting occurrence of an additional event that is not included in the sequence of events; or upon detecting that all of the events in the sequence of events occurred but failed to meet the time period parameter.

13. The method of claim 12, wherein the sequence of events comprises:
a sequence of events having a specified order; or
a sequence of events having no specified order.

14. The method of claim 12, wherein:
the sequence of events comprises a sequence of events having a specified order; and
the trigger is defined, in the subscription, as being satisfied upon detecting that all of the events in the sequence of events occurred but not in the specified order.

15. The method of claim 12, wherein the notification identifies a plurality of events that satisfied the trigger.

16. The method of claim 12, wherein the time period parameter comprises a bounded time period having a beginning time and a subsequent ending time.

17. The method of claim 16, wherein the subscription is sent to the presence server after the beginning time period.

18. The method of claim 12, wherein the time period parameter comprises at least one time limit for the occurrence of the sequence of events, and wherein the at least one time limit comprises at least one of:
an absolute time limit for the occurrence one or more of the events in the sequence of events;
a total time limit for the occurrence of all events in the sequence of events;
a relative time limit of occurrence between two or more of the events in the sequence of events;
a rolling time period for the occurrence of all of the events in the sequence of events, where the sequence of events comprises an unordered sequence of events.

* * * * *